United States Patent
Haas et al.

(10) Patent No.: US 7,536,579 B2
(45) Date of Patent: May 19, 2009

(54) SKEW-CORRECTING APPARATUS USING ITERATIVE APPROACH

(75) Inventors: Wally Haas, Mount Pearl (CA); Mutema John Pittman, St. John's (CA); Chuck Rumbolt, St. John's (CA)

(73) Assignee: Avalon Microelectronics, Inc., Mount Pearl (CA)

( * ) Notice: Subject to any disclaimer, the term of this patent is extended or adjusted under 35 U.S.C. 154(b) by 442 days.

(21) Appl. No.: 11/462,157

(22) Filed: Aug. 3, 2006

(65) Prior Publication Data

US 2008/0031312 A1    Feb. 7, 2008

(51) Int. Cl.
*G06F 1/00* (2006.01)
*H04L 7/00* (2006.01)
*G06F 13/42* (2006.01)
*G11B 20/20* (2006.01)
*H04B 1/38* (2006.01)

(52) U.S. Cl. .................. 713/500; 713/400; 710/106; 714/700; 375/220

(58) Field of Classification Search ............... 713/500; 710/106; 714/700; 375/220
See application file for complete search history.

(56) References Cited

U.S. PATENT DOCUMENTS

| | | | |
|---|---|---|---|
| 6,079,035 A | 6/2000 | Suzuki et al. | |
| 6,201,831 B1 | 3/2001 | Agazzi et al. | |
| 6,336,192 B1 * | 1/2002 | Sakamoto et al. | 713/503 |
| 6,557,110 B2 | 4/2003 | Sakamoto et al. | |
| 6,690,757 B1 | 2/2004 | Bunton et al. | |
| 6,820,234 B2 | 11/2004 | Deas et al. | |
| 6,834,255 B2 | 12/2004 | Abrosimov et al. | |
| 6,839,862 B2 | 1/2005 | Evoy et al. | |
| 6,907,552 B2 | 6/2005 | Collins | |
| 6,920,576 B2 | 7/2005 | Ehmann | |
| 6,937,681 B2 | 8/2005 | Watanabe et al. | |
| 6,996,738 B2 | 2/2006 | Chiang | |
| 7,012,935 B2 | 3/2006 | Woelk et al. | |
| 7,093,172 B2 | 8/2006 | Fan et al. | |
| 7,124,334 B2 | 10/2006 | Kashiwakura | |
| 7,209,907 B2 * | 4/2007 | Cherukuri et al. | 706/16 |
| 7,363,563 B1 | 4/2008 | Hissen et al. | |
| 7,401,246 B2 * | 7/2008 | Martin et al. | 713/500 |
| 2003/0142772 A1 | 7/2003 | Weiss et al. | |
| 2004/0123190 A1 | 6/2004 | Toyoda et al. | |
| 2004/0136411 A1 | 7/2004 | Hornbuckle et al. | |
| 2005/0005051 A1 | 1/2005 | Tseng | |
| 2005/0005184 A1 | 1/2005 | Lindt | |

(Continued)

OTHER PUBLICATIONS

Optical Internetworking Forum (OIF), System Framer Interface Level 5 (SFI-5), Jan. 29, 2002.

(Continued)

*Primary Examiner*—Thomas Lee
*Assistant Examiner*—Stefan Stoynov

(57) ABSTRACT

An apparatus for determining the amount of skew to be injected for system skew compensation in a high-speed data communications system including a plurality of lanes with a data bus per lane. Such skew compensation is necessary due to inherent system skew. By iterating through the possible intervals within the maximum expected skew search space, the correct combination of search space intervals for all lanes can be determined to provide alignment and thus compliancy with relevant standards, such as the SFI-5 and SxI-5 standards, in terms of data skew specifications.

5 Claims, 3 Drawing Sheets

U.S. PATENT DOCUMENTS

| | | |
|---|---|---|
| 2005/0114724 A1 | 5/2005 | Wu |
| 2007/0088991 A1 | 4/2007 | Shin et al. |
| 2008/0031311 A1 | 2/2008 | Haas et al. |
| 2008/0126888 A1 | 5/2008 | Haas et al. |

OTHER PUBLICATIONS

Optical Internetworking Forum (OIF), System Interface Level 5 (Sxl-5), Oct. 2002.

* cited by examiner

SKEW-CORRECTING APPARATUS USING ITERATIVE APPROACH

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to chip-to-chip high speed data communications and the correction of skew in each transmit channel, within relevant specified standards.

2. Description of Related Art

Parallel transmission, as defined with respect to the present invention, is the serial transmission of data over a plurality of lines on a data bus. In this parallel data transmission, skew can be added to each serial data lane through such means as serialization, cross-clock domain crossing, or through static skew parameters such as trace length. This skew can result in different alignments between lines of the data bus. Thus, there is an obvious need to correct this skew, or to deskew the data lines. If the amount of skew added on each line can be found, then a skew injecting apparatus that can compensate for the skew added on each line can eliminate the problem, and thus adhere to relevant standards which specify skew requirements.

The following system description is applicable to any chip-to-chip high speed communications system where skew compensation may be of benefit. Specific standards mentioned throughout, such as SFI-5 and SxI-5, should be considered examples and are in no way exhaustive.

One of the standards describing the objectives and requirements of a multi-bit bus for use in the interconnection between devices in communications systems with up to 50 Gb/s optical links is published by the Optical Internetworking Forum: Serdes Framer Interface Level 5 (SFI-5): Implementation Agreement for 40 Gb/s Interface for Physical Devices, with Serdes referring to Serialization and Deserialization (Dartnell, Lerer, and Lynch, 2002). The electrical I/O characteristics of this interface are defined in the standard System Interface Level 5 (SxI-5): Common Electrical Characteristics for 2.488-3.125 Gbps Parallel Interfaces (Palkert & Lerer, 2002).

The SFI-5 bus has a 16-bit wide data bus with each channel operating at up to 3.125Gb/s with a Deskew, or Parity, Channel. The Serdes component of the communications system thus requires 17 transceivers to handle these 17 lanes. Each one of these transceivers may have different skew characteristics and may therefore cause misalignment to the standard when transmitting data.

BRIEF SUMMARY OF THE INVENTION

To compensate for the skew differences between each individual lane on the transmit side, an algorithm can be implemented to inject skew into each individual lane to re-align the data. Since the amount of skew that should be injected into each lane for compensation purposes is not known, the algorithm will need to be responsible for iterating through different combinations of skew injections for each individual lane until the correct combination has been determined.

This is different from the current systems on the market since those involve grouping bus lines with each group having its own clock domain (U.S. Pat. No. 06839862, Evoy, Pontius, and Ehmann, 2005) or by using multiple synchronization codes (U.S. Pat. No. 06920576, Ehmann, 2005). Evoy et al. describe "grouping the bus lines in groups with each group having its own clock domain, skew across clock-domain groups is tolerated and overcome by processing the data and the skew first within each clock domain group, and then between groups". Ehmann's solution "overcomes skewing problems by transferring digital data with automatic realignment", i.e. using synchronization codes.

The proposed system of the present invention uses neither separate clock domains for bus line groups nor adds synchronization codes, but rather employs an algorithm to systematically iterate through different combinations of individual lane skew settings until the correct combination is achieved, thus eliminating any skew related problems and meeting all relevant standards.

DETAILED DESCRIPTION OF THE INVENTION

Figure 1:
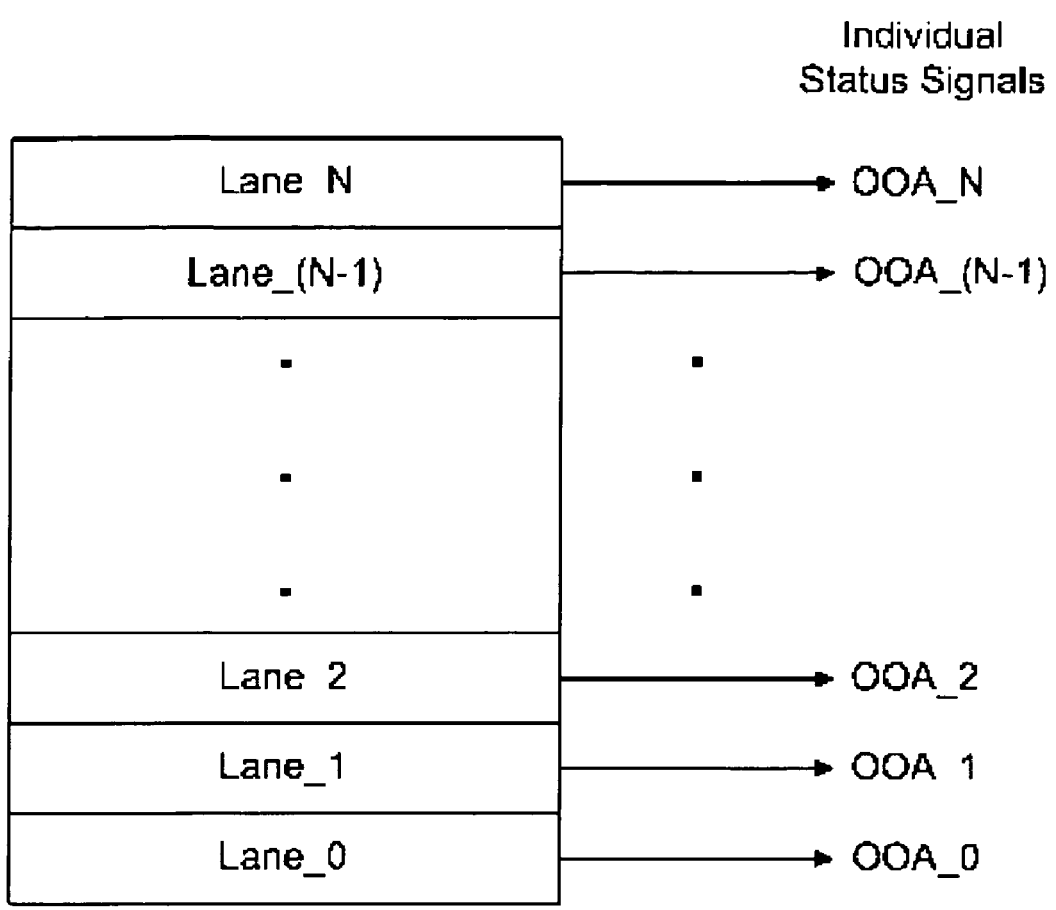
FIG. 1 is a block diagram of how the deskew algorithm may be implemented if using out-of-alignment signals for each individual lane.

On the transmit side, skew can be injected on a per-lane basis to compensate for any skew added by the system, such as Field Programmable Gate Array (FPGA) startup conditions. This injected skew achieves compliancy as specified by applicable standards, such as SxI-5. To determine how much skew should be injected to meet these standards, the following algorithm is implemented.

The present invention consists of N+1 transceivers for the purposes of data transmission and reception. The system is designed such that a deskewing algorithm can be used to determine the necessary per-lane skew to be added for total lane alignment.

The term "deskewing algorithm", as used herein, refers to a calibration method to achieve total lane alignment with respect to a desired lane-to-lane skew goal, usually defined by standards such as SxI-5. These standards often specify skew related characteristics in terms of the unit interval, or UI. UI is calculated via 1/(data bit rate). The method uses an iterative process to determine the correct combination of skew injection parameters for each transmitting lane.

In order to determine this suitable combination, skew is systematically injected into each lane. On the receive side, a feedback signal is necessary to give status updates as to alignment of the lane. This feedback signal may be specific to the particular lane or can be an aggregation of some or all of the lanes. When alignment is successful, the feedback signal will indicate this success, thus indicating that the correct amount of skew has been injected and proper deskewing has occurred.

If the feedback signal is particular to a single lane, then the process of injecting skew will have to be performed for each lane. For an aggregated feedback signal, the process of injecting skew will occur on all lanes, as only one combination will satisfy the aggregated status. This process will take much longer as the search space of combinations will be much larger.

The system of the present invention enables the deskewing of lanes through the use of a deskewing algorithm. The following examples will illustrate the workings of possible systems in more detail. These examples will deal with smaller 3 transceiver systems. The 3 transceiver example is easily expandable into an SFI-5 system with 17 transceivers, or any other transceiver-based system. Transceivers are herein referred to also as MGTs (Multi-Gigabit Transceivers).

The following examples are set forth to gain a better understanding of the algorithm portion of the invention described herein. These examples are provided for illustrative purposes only and they should not limit the scope of this invention in any way.

EXAMPLE 1

Per-Lane Feedback Signal

The system in this case has a feedback signal for each individual lane that reports on the successful, error-free reception of the data stream on that particular lane. Error free reception is expected when an appropriate amount of skew has been injected on the individual lane relative to a reference lane. When one lane's feedback signal reports the correct alignment, the process begins with the next lane, until all lanes have been aligned and thus deskewed. This system is shown in FIG. 1.

In Example 1, there is a plurality of feedback signals—one for each lane as illustrated in FIG. 1. The variables and constants used in this example are defined as:

Definition List 1

| Term | Definition |
| --- | --- |
| OOA_0 | Out of Alignment (OOA) Alarm for Lane 0 |
| OOA_1 | Out of Alignment Alarm for Lane 1 |
| OOA_2 | Out of Alignment Alarm for Lane 2 |
| OOA_n | Out of Alignment Alarm for the $n^{th}$ Lane |
| n + 1 | Total number of lanes |
| S | Search space size |
| i | Search space interval |
| t | Time to wait to check for OOA alarm in seconds |
| C | Maximum amount of search intervals |
| T | Total time to iterate through all search intervals |

For the three MGT system, there is an out-of-alignment alarm for each lane, labeled OOA_0, OOA_1, and OOA_2. Each alarm will report an error should one occur on its respective lane. These alarms are expected to remain set if the correct alignment has not occurred, and are expected to clear within a specified time (t) if correct alignment has been achieved.

The search space, S, refers to the maximum UI that a lane may be expected to be out of alignment. With reference to the applicable standard, there is typically a specification as to the maximum allowable skew tolerance in order to achieve compliancy with said standard. For the SxI-5 standard, that maximum allowable skew tolerance between lanes is set at 5 UI. The search space interval, i, must be set at a value less than this skew tolerance. To achieve the fastest possible search times, it is best to set the search space interval at 1 UI below the skew tolerance level specified in the applicable standard. Thus, with reference to the SxI-5 standard, the search space interval, i, should be set to 4.

For the purposes of this example, the search space, S, will be set at 20 UI, which is an arbitrary choice, with the search space interval, i, set to 4 UI. This gives five possible sets of interval choices for each lane, i.e. from 0-4, 4-8, 8-12, 12-16, and 16-20.

The process begins with Lane 0 set in the first interval position. If the out-of-alignment alarm, OOA_0, indicates an alarm condition after a specified wait-time (t), then the lane realigns to the next interval position. Again, the OOA_0 alarm is checked and if the alarm condition is still active the next interval position is tested. This process continues until the OOA_0 alarm indicates alignment for a specific interval position or the entire search space has been exhausted. For this reason it is important to choose the search space such that it is large enough to take in the maximum expected lane skew deviation.

Assuming the OOA_0 alarm indicates that Lane 0 has achieved alignment, the process begins for the next lane, Lane 1. When the alarm for Lane 1, OOA_1, indicates successful alignment, the process continues for Lane 3. When the alarms for each lane have achieved alignment, the process ends.

The maximum amount of search intervals for this example that have to be traversed through is 15, i.e. five intervals for each of the three lanes. In order to determine the maximum amount of search intervals for a different system, the following variables need to be known:

n+1, the total number of lanes
S, the search space size
i, the search space interval Therefore, the maximum amount of search intervals, C, can be determined through the following formula:

$$C = (n+1)*S/i$$

In order to determine an approximate maximum time for the searching process, the maximum amount of search intervals must be multiplied by the time, t, necessary to wait for an OOA alarm check. Thus the maximum wait time, T, is given by:

$$T = t*(n+1)*S/i$$

By following this process, all lanes can be deskewed sequentially to provide total lane alignment in compliancy with relevant standards, such as SxI-5.

EXAMPLE 2

Aggregated Feedback Signal

The system in this case has a feedback signal that reports the aggregated status across all lanes, i.e. there is only one feedback signal for the entire system. Thus only when every lane has been deskewed will the feedback signal report success. This system is shown in FIG. 2.

Figure 2:
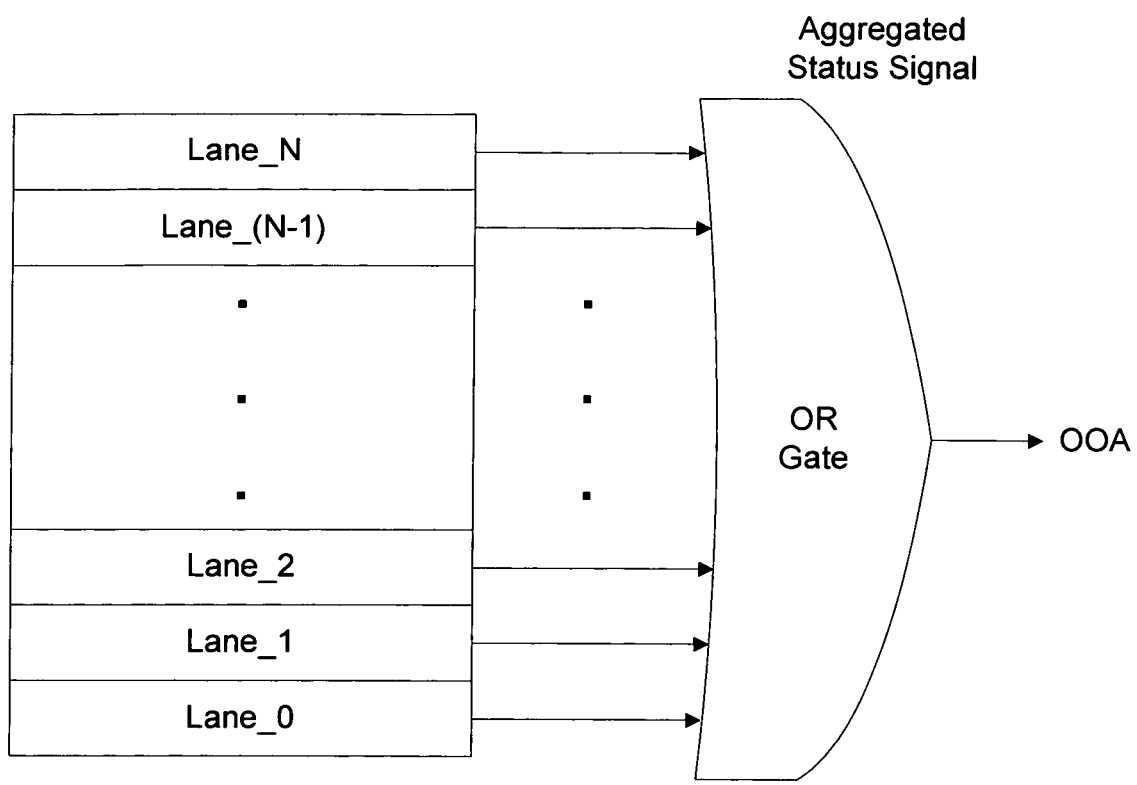
FIG. 2 is a block diagram of how the deskew algorithm may be implemented if using an aggregated out-of-alignment signal providing the status for all lanes.

In Example 2, there is one aggregated feedback signal, i.e. the combination of all feedback signals as illustrated in FIG. 2. If there is an out-of-alignment error for either lane, the aggregated signal will report an error. The variables and constants used in this example are defined as:

| Definition List 2 | |
| --- | --- |
| Term | Definition |
| OOA | Aggregated Out of Alignment Alarm |
| n + 1 | Total number of lanes |
| S | search space size |
| i | search space interval |
| t | time to wait to check for OOA alarm in seconds |
| C | maximum amount of search intervals |
| T | total time to iterate through all search intervals |

For the three MGT system, there is an aggregated out-of-alignment alarm combining the status for each lane, labeled OOA. The alarm will report an error should one occur on any lane.

The search space, S, refers to the maximum UI that a lane may be expected to be out of alignment. With reference to the applicable standard, there is typically a specification as to the maximum allowable skew tolerance in order to achieve compliancy with said standard. For the SxI-5 standard, that maximum allowable skew tolerance between lanes is set at 5 UI. The search space interval, i, must be set at a value less than this skew tolerance. To achieve the fastest possible search times, it is best to set the search space interval at 1 UI below the skew tolerance level specified in the applicable standard. Thus, with reference to the SxI-5 standard, the search space interval, i, should be set to 4.

For the purposes of this example, the search space, S, will be set at 20 UI, which is an arbitrary choice, with the search space interval, i, set to 4 UI. This gives five possible sets of interval choices for each lane, i.e. from 0-4, 4-8, 8-12, 12-16, and 16-20.

The process begins with all lanes set in the first interval position. If the out-of-alignment alarm, OOA, indicates an alarm condition after a specified wait-time then the first lane realigns to the next interval position. Again, the OOA alarm is checked and if the alarm condition is still active the next interval position for the first lane is tested. This process continues for all five interval positions. If the OOA alarm still indicates an alarm condition then the next lane can be iterated through, while still iterating through the first lane. This process can be lengthy as since there is only one global alarm making the range of combinations much larger. The process ends when the OOA alarm indicates alignment for a specific interval position on each lane or the entire search space has been exhausted. For this reason it is important to choose the search space such that it is large enough to take in the maximum expected lane skew deviation.

The maximum amount of search intervals for this example that have to be traversed through is 125, i.e. five intervals for each of the three lanes. In order to determine the maximum amount of search intervals for a different system, the following variables need to be known:

n+1, the total number of lanes
S, the search space size
i, the search space interval Therefore, the maximum amount of search intervals, C, can be determined through the following formula:

$$C=(S/i)^{(n+1)}$$

In order to determine an approximate maximum time for the searching process, the maximum amount of search intervals must be multiplied by the time, t, necessary to wait for an OOA alarm check. Thus the maximum wait time, T, is given by:

$$T=t*(S/i)^{(n+1)}$$

By following this process, all lanes can be deskewed to provide total lane alignment in compliancy with relevant standards, such as SxI-5.

The previously explained deskewing methods are only considered as examples. Different configurations of each are possible as long as deskewing is achieved. Combined configurations, such as multiple aggregated signals for groups of lanes, are also possible as long as deskewing is achieved.

Figure 3:
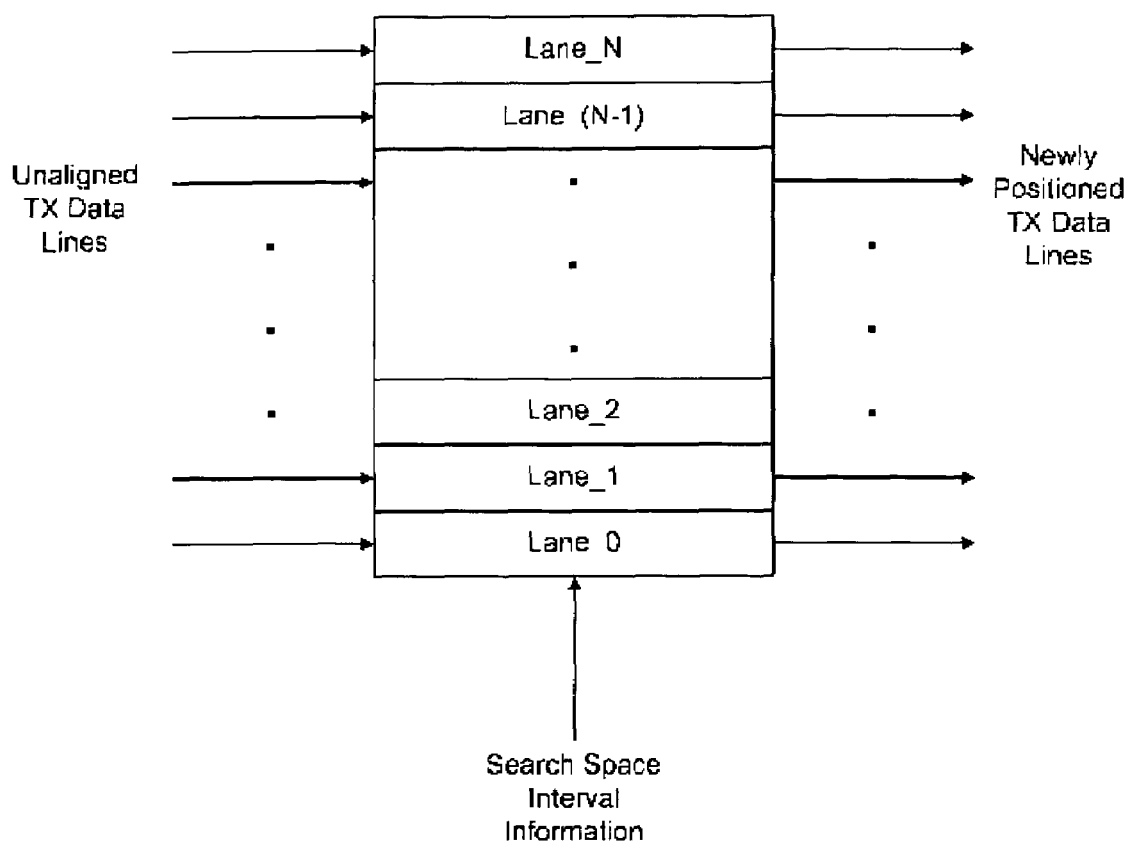
FIG. 3 is a block diagram of how the skew injection technique may be implemented.

In order to inject the appropriate amount of skew into each lane to traverse the different search space intervals, the unaligned transmit (TX) data lines enter a buffer, such as a First-In-First-Out (FIFO) buffer, for the purposes of lane deskewing. The skew values to be injected for each lane are supplied to the buffer. The buffer then bit shifts each lane the appropriate amount to move to a different alignment position as specified by the search space intervals. A representation of a possible embodiment of this injection system is shown in FIG. 3. The output from the buffer is the re-aligned TX data lines, which can then be tested for compliancy against the skew specifications for relevant standards, as per the description of the algorithm.

REFERENCES CITED

| U.S. Patent Documents | | | |
| --- | --- | --- | --- |
| 6557110 | April, 2003 | Sakamoto et al. | 713/503 |
| 6690757 | February, 2004 | Bunton et al. | 375/371 |
| 6820234 | November, 2004 | Deas et al. | 714/814 |
| 6839862 | January, 2005 | Evoy et al. | 713/503 |
| 6907552 | June, 2005 | Collins | 714/700 |
| 6920576 | July, 2005 | Ehmann | 713/400 |
| 6996738 | February, 2006 | Chiang | 713/503 |

Other References

OIF, System Framer Interface Level 5 (SFI-5), Jan. 29, 2002
OIF, System Interface Level 5 (SxI-5), October 2002

What is claimed is:

1. A skew detection apparatus for detecting the amount of skew in at least one of a plurality of transmitting lanes, in relation to a reference lane, of a parallel data transmission system, comprising:
   (a) a plurality of transmitting lane pairs with one of a plurality of transceivers for each of said plurality of transmitting lane pairs, said plurality of transceivers comprising a transmitter and a receiver, wherein one of said plurality of transmitting lane pairs is a reference lane and one of said plurality of transceivers is a reference transceiver; and
   (b) one or more of a plurality of feedback signals, wherein one or more of said plurality of transmitting lane pairs are coupled at said transmitters to one or more of a plurality of status signals at said receivers via said plurality of feedback signals; and
   (c) an amount of skew in at least one of said plurality of transmitting lane pairs, wherein said amount of skew is determined by a iterative process, said iterative process comprising a algorithm which is implemented to systematically iterate through a plurality of skew injection parameters for each of said plurality of transmitting lane pairs to identify one or more offsetting skew amounts to be injected into any of said plurality of transmitting lane pairs, at the transmit side of a circuit, to re-align said plurality of transmitting lane pairs and achieve transmission lane alignment.

2. The apparatus of claim 1, wherein said plurality of feedback signals are associated with one of said plurality of transmitting lane pairs, one or more groups of said plurality of transmitting lane pairs, or a aggregate signal of all of said plurality of transmitting lane pairs.

3. The apparatus claim 1, wherein said plurality of feedback signals report the successful, error-free reception of a data stream from at least one of said receivers to at least one said transmitters.

4. A skew correction apparatus for correcting the amount of skew in at least one of a plurality of transmitting lanes, in relation to a reference lane, of a parallel data transmission system, comprising:
 (a) a plurality of transmitting lane pairs with one of a plurality of transceivers for each of said plurality of transmitting lane pairs, said plurality of transceivers comprising a transmitter and a receiver, wherein one of said plurality of transmitting lane pairs is a reference lane and one of said plurality of transceivers is a reference transceiver; and
 (b) a buffer to delay said plurality of transmitting lane pairs by a Unit Interval of Time (UI); and
 (c) a offset to said buffer with information on an amount of skew in at least one of said plurality of transmitting lane pairs, wherein said amount of skew is determined by a iterative process, said iterative process comprising a algorithm which is implemented to systematically iterate through a plurality of skew injection parameters for each of said plurality of transmitting lane pairs, thereby indicting a offsetting skew amount to be injected into any of said plurality of transmitting lane pairs, at the transmit side of a circuit, to re-align said plurality of transmitting lane pairs and achieve transmission lane alignment.

5. The apparatus of claim 4, wherein said buffer is a First-In-First-Out (FIFO) buffer.

* * * * *